UNITED STATES PATENT OFFICE.

RICHARD LAUCH AND FRITZ QUADE, OF BERLIN, GERMANY, ASSIGNORS TO JOHANN ABRAHAM von WÜLFING, OF BERLIN, GERMANY.

METHOD OF PRODUCING COMPOUNDS OF FORMALDEHYDE WITH SUGARS.

1,055,405.  Specification of Letters Patent.  Patented Mar. 11, 1913.

No Drawing.  Application filed February 28, 1912. Serial No. 680,526.

*To all whom it may concern:*

Be it known that we, RICHARD LAUCH, doctor of philosophy, and FRITZ QUADE, doctor of chemistry, both citizens of the Empire of Germany, and residing at Berlin, in the Empire of Germany, have invented a new and useful Method of Producing Compounds of Formaldehyde with Sugars, of which the following is a specification.
Our invention relates to a variation of the process for the production of a compound from milk sugar and formaldehyde described in the U. S. Patent No. 849,815. By the said process a compound containing one molecule of milk sugar and five molecules of formaldehyde is obtained.

Our invention consists in processes of producing compounds containing one molecule of carbohydrate (milk sugar, cane sugar, maltose) and a whole number less than five of molecules of formaldehyde.

We will now proceed to describe our invention.

In the British Patent No. 6,653 of 1897 it has already been stated, it is true, that a combination is formed when one molecule of milk sugar is brought into aqueous solution with one molecule of formaldehyde and the excess of water is expelled at temperatures below 50° centigrade (compare page 3, line 46 of the specification). How ver, experiments have proved it to be impossible to obtain a solid compound at this temperature. The mixture was kept each time for nine hours *in vacuo* at 50° centigrade and it nevertheless remained permanently a tough syrup, the content of which in formaldehyde remained less than the theoretical quantity. It is certain, that the applicants for the aforesaid British patent never had the fixed combination of one molecule to one molecule in hand and could not have had it because they assumed that this compound decomposes at temperatures over 50° centigrade.

We have now observed, that at temperatures up to 70° centigrade the compound of one molecule biose and one molecule formaldehyde can be obtained in the solid state without experiencing a decomposition. If, however, it is desired to attain the proper molecular proportion the mixture must be made with an excess of formaldehyde.

We have ascertained that the compound is soluble in alcohol, but with much greater difficulty than the old compound having the proportion 1:5. If 5 grams of the solid compound are treated for half an hour in the agitating machine with 100 grams of absolute alcohol, 1.1 grams of the compound are dissolved. We have further discovered that milk sugar combines with formaldehyde in the proportion of 1:2, 1:3, 1:4, but that the firmness of the combination decreases with the increasing percentage of formaldehyde, and the solubility of alcohol increases. Thus of 5 grams of the combination 1:2 was dissolved by shaking in 100 grams of absolute alcohol 2.1 grams in half an hour, of the combination 1:3 under the same conditions 3 grams, and taking 7 grams of the combination 1:4 under the same conditions 5.7 grams were dissolved. For physiological purposes the compounds with a greater amount of formaldehyde will doubtless be more efficient in the organism (on account of their more easy dissociation) whenever it is a question of a rapid decomposition, and those with less formaldehyde when it is desired to obtain a more gradual dissociation, for instance in the case of external disinfection. The decreasing tendency to combination of the milk sugar with the formaldehyde corresponds to the calculated loss of formaldehyde per unit of milk sugar in the preparation of the compound. For the preparation of the compound 1:1 it is only necessary to make use of a very small excess of formaldehyde. For the compound 1:2 the operation takes place with about one molecule $CH_2O$ more than calculated. If the compound 1:3 is required, then something more than four molecules formaldehyde must be taken per molecule of milk sugar, and for the compound 1:4 two molecules in excess. If the preparations are made according to the gravity proportions which lie between the above named limits, then there will result as the solubility tests in alcohol have shown, mixtures of the above named compounds.

Losses of formaldehyde which vary according to the nature and capacity of the drying apparatus may be avoided up to a certain degree and the same compounds obtained if the milk sugar without being previously dissolved is gradually brought into contact with careful intermingling with the high percentage formaldehyde solution of commerce and the homogeneous mixture is dried *in vacuo* at a temperature of about 70° centigrade. When formalin solution is mixed with a great excess of sugar and the water present is then evaporated, a portion of the sugar remains insoluble in alcohol, which shows that there is no combination. Another part is soluble in alcohol, and in the alcoholic extract there are found sugar and formaldehyde in the proportion of 1:1.

All the compounds are soluble in water and are split up thereby and this, as ascertained by freezing point determinations, takes place at various speeds, the compound 1:4 much quicker than the compound 1:1. In the alcoholic solution there also takes place a splitting up, which however proceeds very much more slowly so that it is possible to precipitate from the alcoholic solution by means of other organic solvents, especially ether and acetic ester, flocculent or crystalline masses which fairly resemble in their formaldehyde content the original products and moreover the more nearly the more slowly the original product has been split up. In the case of the body 1:1 it is even possible to obtain back directly from the hot alcohol on cooling a product which shows the aforesaid formaldehyde content of the original product. This product, which is always very difficultly soluble separates out readily as a white mass from the syrup still containing 10% of water on standing for several days. Products which possess a considerably higher content of formaldehyde than the proportion 1:5 are not clearly soluble in alcohol. A residue remains behind which when purified on the centrifugal proves to be paraformaldehyde. Corresponding combinations were also obtained with other bioses such as cane sugar and maltose.

The aforesaid preperations are intended for application to therapeutic purposes.

*Example I.* (*Milk sugar.*)—For the preparation of the compounds one molecule of milk sugar is dissolved in as little hot water (100° centigrade) as possible and to the hot solution the formaldehyde solution of commerce (35 to 40%) is added in the following proportion for the preparation of the 1:1 compound 1.1 molecule, for the preparation of the 1:2 compound 2.8 molecules, for the 1:3 compound 4.2 molecules, for the 1:4 compound 6 molecules.

The solution is dried *in vacuo* at 70° centigrade and after cooling in a water free space it is pulverized. The resulting powder is white and its solution in water is transparent and clear.

As the result of the operation described above is dependent on the rapidity of the evaporation, the apparatus, etc., the given quantities of the formaldehyde excess are variable; for instance, if the operation be conducted quickly by aid of a large vacuum pump, the loss of formaldehyde is relatively small, while with a less efficient exhauster and slower drying more formaldehyde is given off; but in any event the uniformity of the decreasing tendency to a combination of the milk sugar is perceptible in the described sense.

In the last stage of the process when the combinations are already formed, when working on the industrial scale in order to hasten the drying, the syrup can be mixed in the mixing machine with indifferent media such as talc, magnesia, etc., also in a known manner with milk sugar and the last traces of water can be removed by drying in the open air at 70° centigrade.

The finished products can be compounded with sugar, malt extract or the like into tablets, or with ointment ingredients free from water into ointment, or with starch, talc or the like into puff powders and powders for sprinkling and so forth.

*Example II.* (*Cane sugar.*)—Cane sugar can be combined with formaldehyde in a manner similar to milk sugar as described in Example I. The resulting powders are also white and the aqueous solutions of all products are transparent and clear. We may mention, that the compound 1:1 forms a weakly hydroscopic powder, of which 2.3 grams are dissolved in 100 grams of absolute alcohol by shaking for half an hour.

*Example III.* (*Maltose.*)—For forming compounds from maltose and formaldehyde similar rules to those given in Example I may be adhered to. For instance the compound 1:4 is produced by dissolving one molecule of maltose in as little hot water (100° centigrade) as possible and to the hot solution 6 molecules of the formaldehyde solution of commerce (35 to 40%) are added. The solution is then dried *in vacuo* at 70° centigrade and after cooling in a water free space it is powdered. The white powder so obtained is pretty strongly hydroscopic. At the room temperature 3.4 parts of this powder are dissolved in 100 parts of absolute alcohol in the agitating machine after half an hour.

The aqueous solutions of all products are also transparent and clear.

We claim:

1. The process of producing a compound containing one molecule of biose and a whole number less than 5 molecules of formaldehyde, which process consists in dissolving the biose in the smallest possible quantity of hot water, adding formaldehyde solution of commerce in a quantity not more than 1 and ½ times in excess of the formaldehyde in the final product, and drying the solution *in vacuo* at 70° C.

2. The process of producing a compound containing one molecule of biose and a whole number less than 5 molecules of formaldehyde, which process consists in dissolving the biose in the smallest possible quantity of hot water, adding formaldehyde solution of commerce in a quantity not more than 1 and ½ times in excess of the formaldehyde in the final product, drying the solution *in vacuo* at 70° C., cooling the dried mass and powdering it.

3. A new compound, containing one molecule of biose and a whole number less than 4 molecules of formaldehyde, said compound being a white crystalline powder without sharp smell in its dry state and being soluble without any color in water and in alcohol, while being rapidly split up in water and slowly in alcohol.

RICHARD LAUCH.
FRITZ QUADE.

Witnesses for the said Richard Lauch:
HENRY HASPER,
WOLDEMAR HAUPT.

Witnesses for the said Fritz Quade:
GOTTFRIED NEUENDORFF,
KONRAD BROHM.